Feb. 22, 1938.  J. H. BROWNJOHN  2,109,442
MEANS FOR TEACHING AND PRACTICING TYPEWRITING
Filed Dec. 10, 1936  3 Sheets-Sheet 1

Inventor,
Joseph Henry Brownjohn
By Frank S. Ashleman
attorney

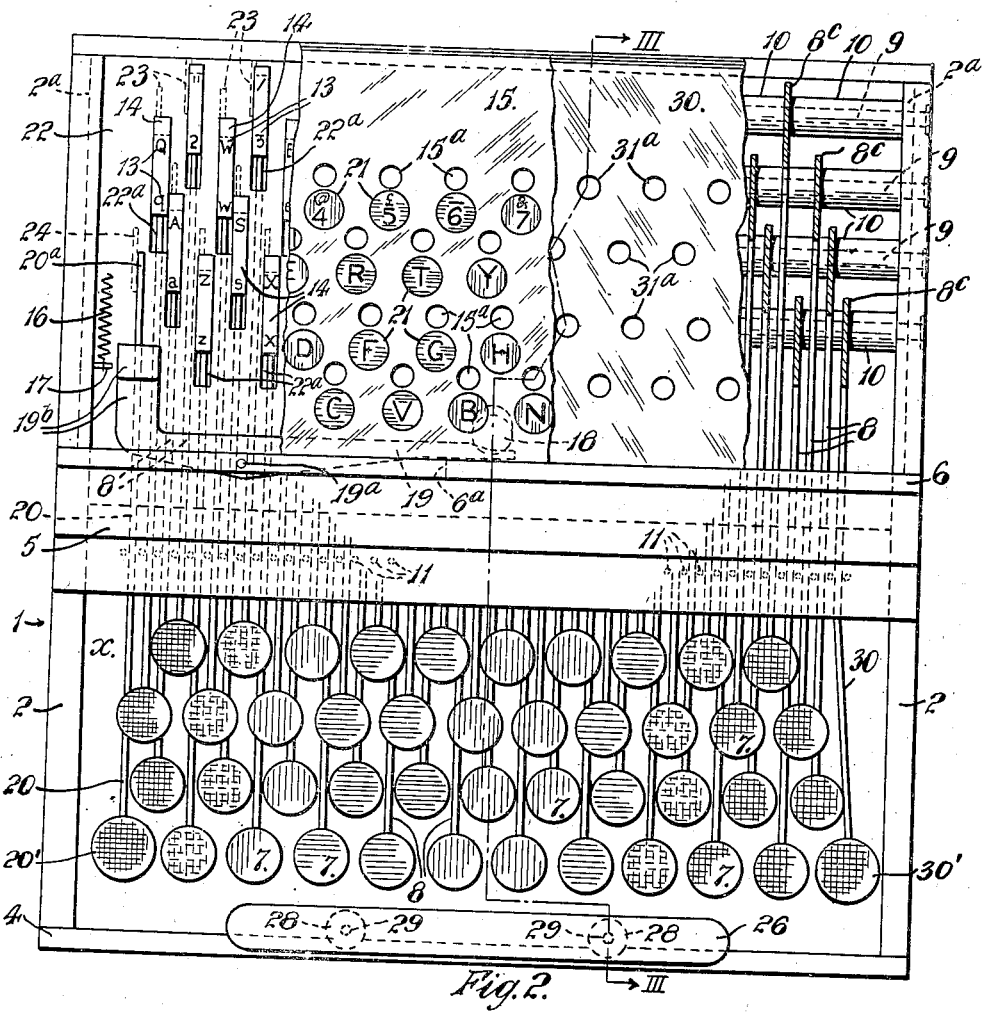

Feb. 22, 1938.  J. H. BROWNJOHN  2,109,442
MEANS FOR TEACHING AND PRACTICING TYPEWRITING
Filed Dec. 10, 1936  3 Sheets-Sheet 3
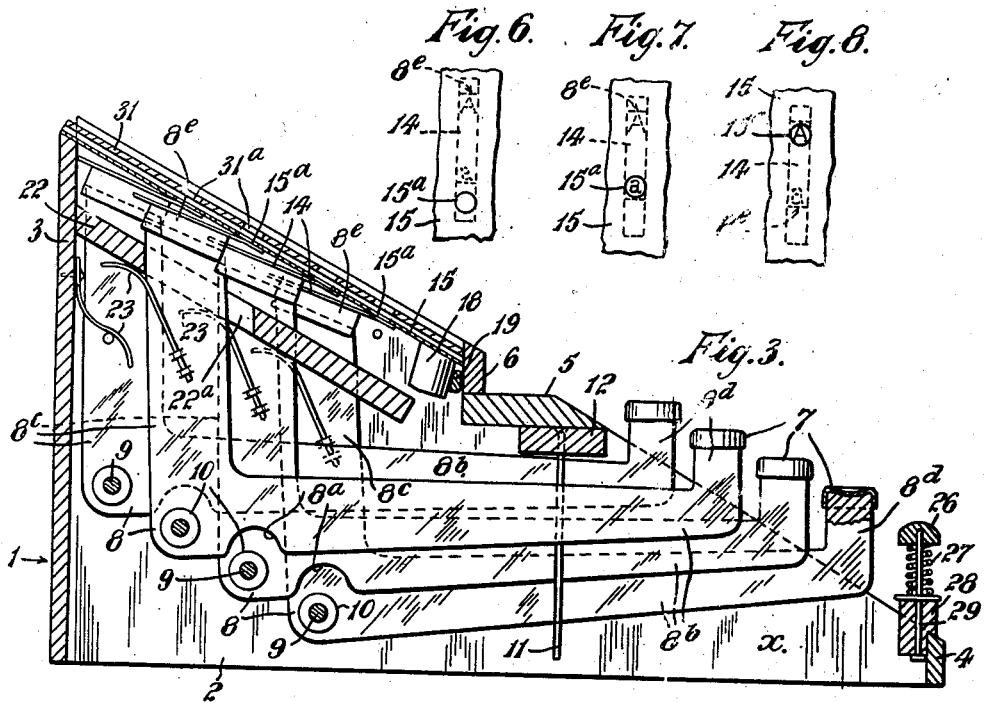
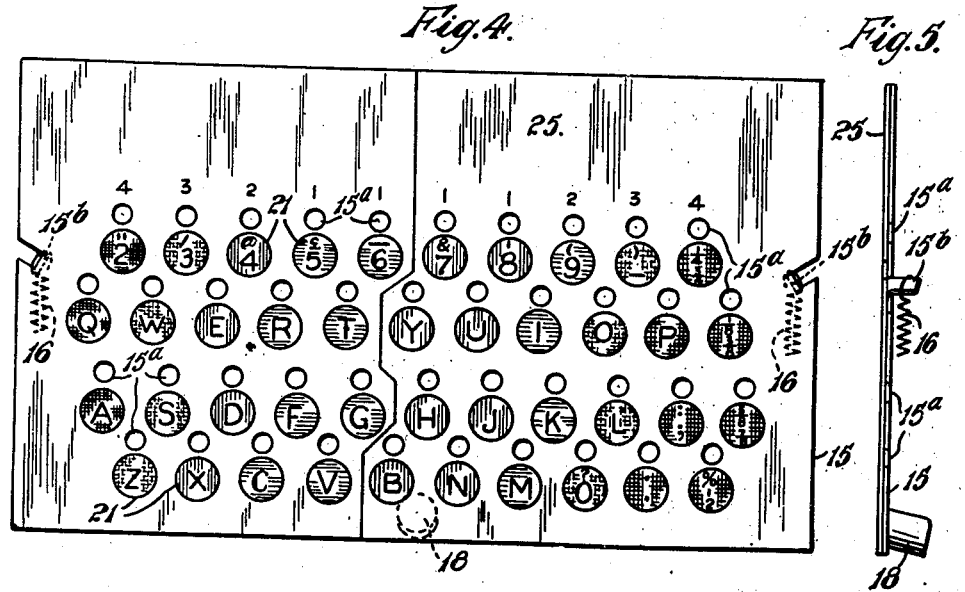
Inventor,
Joseph Henry Brownjohn
By Frank S. Appleman,
attorney.

Patented Feb. 22, 1938

2,109,442

UNITED STATES PATENT OFFICE 2,109,442

MEANS FOR TEACHING AND PRACTICING TYPEWRITING

Joseph Henry Brownjohn, Leicester, England, assignor to Imperial Typewriter Company Limited, Leicester, England, a British company Application December 10, 1936, Serial No. 115,216
In Great Britain December 20, 1935

4 Claims. (Cl. 35—5)

This invention relates to means for use in teaching and practicing typewriting, and its object is to provide a device of an improved form applicable for use particularly by a pupil or other learner so as to enable same quickly to become proficient in the art of typing and especially touch typing.

The opportunities which a pupil or learner has for acquiring the art of typewriting are sometimes restricted to practicing upon an actual typewriter in a commercial school or class, the time spent in actual operation of a typewriter amounting to no more than a few hours per week at the most. The acquisition of a typewriter for personal use is beyond the reach of the majority of pupils or learners and there is therefore a real need for a relatively inexpensive but practical device adapted to serve as a substitute for an actual typewriter in so far as manipulation of the keys is concerned so as to enable the pupil or learner readily to acquire accuracy and speed.

The present invention therefore has in view the provision of a relatively simple and inexpensive device capable of fulfilling these requirements and which can be purchased for use at home as well as in schools or classes.

In the accompanying drawings,

Figure 2 is a plan view of the same partly in section and with parts of the indicator broken away to show the rear ends of some of the type bars or levers.

Figure 3 is a transverse sectional view of the device taken on the line III—III of Figure 2.

Figures 4 and 5 are plan and edge views respectively of the indicator per se.

Figures 6, 7 and 8 are detail views hereinafter to be described.

Like parts are designated by similar reference characters throughout the drawings.

Figure 1:
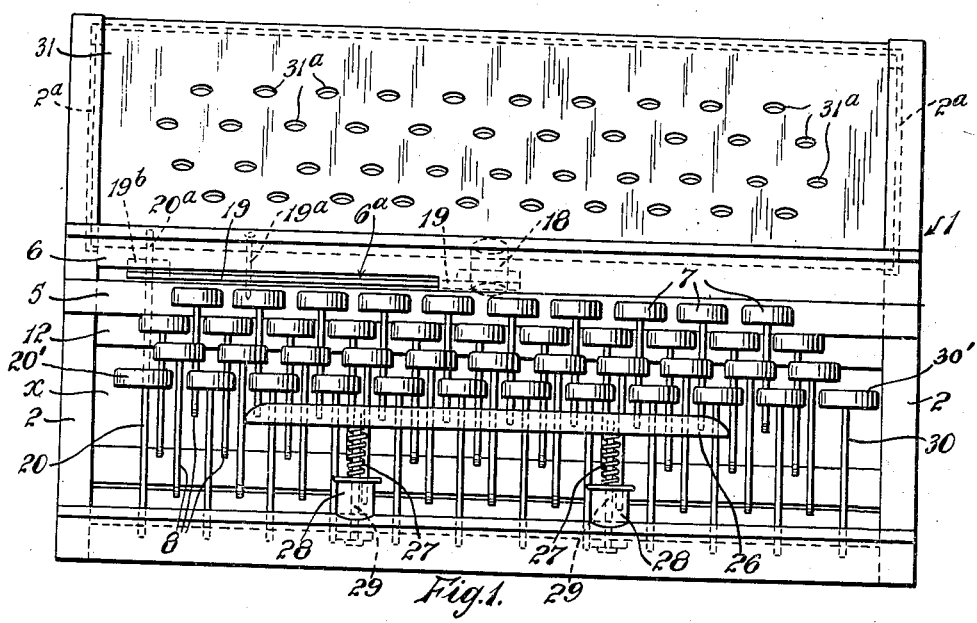
Figure 1 is a front elevational view of the device, constituting one practical example of the invention.

Referring to the drawings, it will be seen that the device comprises a frame or casing 1 consisting of side members 2, a back member 3 and one or more cross members such as 4, 5 and 6 and has a space or opening $x$ at the front to provide accommodation for a series of blank keys 7 corresponding in number and arrangement with the conventional or standardized keyboard of a typewriter. The keys 7 are formed integrally with or, as shown more clearly in Figure 3, are attached to, type levers 8 pivotally mounted in rows upon rods or bars such as 9 fixed parallel to each other in the side members 2 of the frame or casing. In the specific example illustrated the type levers 8 are maintained in proper laterally spaced relation by means of spacing bushes 10 placed loosely upon the rods or bars 9 (see Figures 1 and 3). Alternatively and for the same purpose bosses may be formed integrally with or applied to the respective levers at the pivotal centres. In this connection each of the levers 8, with the exception of those in the bottom row, is formed in its underside with a recess such as 8a (see Figure 3) so that the lever when operated, i. e. depressed, will not foul the nearby spacing bush 10 or its equivalent. Other spacing means or guides may, as shown, be provided between the front end of each lever 8 and the pivotal centre. As will be seen in Figures 1 and 3 these guides or spacing means are constituted by stiff wires or thin rods such as 11 fixed in a bar 12 so as to extend vertically downwards therefrom in pairs, each pair embracing a lever 8. The bar 12 conveniently constitutes one of the cross members of the frame or casing or it may be secured in any suitable manner to the underside of the cross member 5. The type levers 8 are in the form of bell-cranks each arranged so that one arm 8b extends forwards and the arm 8c extends upwards when in the normal position. Each arm 8b has a bent extremity 8d which projects upwards and has the corresponding key 7 applied thereto. The type characters 13 are provided at the extremities 8e of the arms 8c. These characters (of which there are two, one above the other, on each lever) are preferably printed upon small labels or the like, such as 14, consisting, for example, of paper tabs or discs, and stuck or otherwise fastened on the levers. Alternatively, however, the said characters may be marked or embossed on the levers themselves. In any event the extremities 8e of the arms 8c are preferably enlarged for reception of the type characters 13.

The upper edges of the side members 2 aforesaid are inclined or sloped and are grooved at 2a on the insides for some distance inwards from their rear ends parallel and adjacent to the inclined or sloping edges for the reception of a perforated card or sheet 15 the perforations 15a in which are formed in rows to correspond with the keyboard. This perforated card or sheet 15 is slid into position in the grooves 2a and by means of the cross member 6 which constitutes a stop is located so that the perforations are situated immediately over the upstanding arms 8c of the bell crank levers 8 so that when a lever is operated one of the characters 13 thereon can be seen through the corresponding perforation. The perforations 15a therefore constitute windows at which characters 13 on the type levers 8 can be caused to appear when the keys 7 are struck. In an alternative arrangement, the card or sheet 15 may be located in position at its inner or front edge either by forming the grooves 2a with closed ends, or by fixing small stop blocks or pins at the inner ends of these grooves. In the normal position of the perforated card or sheet 15, i. e., the position in which its inner or front edge is up against the stop or stops, the type characters 13 on each of the type levers 8 bear a relation to the corresponding window 15a such as that indicated in Figure 6, and the lower character, e. g. the small letter in the case of alphabetical characters, appears at this window when the corresponding key 7 is struck (see Figure 7). The card or sheet is held in this position by means of tension springs or the like, one at each side thereof, and each anchored at one end to the card or sheet and at the other end to the adjacent side member 2. In the specific example illustrated, tension springs, such as 16, are employed for this purpose, one end of each of these springs being anchored to a lug or projection 15b formed on the card or sheet 15 while the other end is anchored to a pin or peg 17 inserted in the adjacent side member of the frame. To enable the other set of characters, e. g. the capital letters in the case of the alphabetical characters, to be seen through the windows 15a when the keys 7 are struck the card or sheet 15 is slid rearwards to a limited extent against the spring action and to enable this to be done the said card or sheet is furnished on the underside with a depending boss, pin or lug such as 18, adapted to be acted on by an operating lever 19. As will be seen, this lever is pivoted at 19a centrally or substantially so in a horizontal position on the cross member 5 with one end located adjacent to the said depending boss, pin or lug 18 and the other located in the path of movement of a lever 20 which is furnished with a key 20' and pivotally mounted in the frame or casing 1 in a similar manner to the type levers 8. The said boss, pin or lug 18 is located centrally at the lower edge of the card or sheet 15 and the operating lever 19 extends therefrom to the left side of the device, the lever 20 being accordingly located on the same side of the device and corresponding to one of the shift keys of an actual typewriter. In the specific example illustrated, moreover, the operating lever 19 works in a slot 6a in the cross member 6 and is formed with a rearwardly extending arm 19b adapted to be acted on at the appropriate times by an upwardly extending part 20a, (Figures 1 and 2), of the lever 20. If desired two operating levers such as 19 extending in opposite directions from the central boss, pin or lug, 18 and two levers such as 20 one at each side of the device, may be provided.

As will be understood, the part 20a is somewhat similar to one of the upwardly extending arms 8c on a type lever 8 and when the key 20' is depressed, the said part 20a and hence also the arm 19b is moved towards the front of the device with the result that the lever 19 is turned on its pivot 19a to effect a rearward sliding movement of the card or sheet 15.

Applied to, or printed or otherwise marked on, the card or sheet 15 below each perforation 15a is a disc or like 21, these discs or the like bearing characters indicative of those which will appear in the windows when the corresponding keys are struck. For this purpose paper discs or labels appropriately marked may be stuck on the card or sheet.

In this particular example the keys 7 to be struck by the fingers of the left hand are divided into four groups coloured respectively blue for first finger, red for the second finger, yellow for the third finger and black for the fourth finger. Likewise the keys to be struck by the fingers of the right hand are divided into four groups coloured respectively red for the first finger, blue for the second finger, yellow for the third finger and again black for the fourth finger. The various colours of the keys are indicated by means of conventional forms of shading; that is to say, blue is shown by horizontal lines, red by vertical lines, yellow by broken horizontal and vertical lines and black by heavy horizontal and vertical lines. Obviously, however, any other colour scheme may be adopted. For example, it is sometimes convenient to use grey instead of blue and white instead of yellow. The discs or the like 21 are also differently coloured correspondingly and, if desired, the card or sheet may also be marked with the numbers 1, 2, 3 and 4 so as to give indications as to the fingers which should be used for striking the keys (see Figure 4).

The device preferably includes, as shown in Figure 3, a slotted board or plate, grill or grid such as 22 the slots or apertures 22a in which correspond in number and disposition with the rear arms 8c of the type levers 8, the said arms being located in these slots or apertures so that lateral displacement or "spring" is prevented. The said board, plate, grill or grid also serves as a stop to limit movement of the type levers in each direction; that is to say the slots or apertures 22a are made of such a length that when each of the type levers 8 is depressed sufficiently to bring the type character in sight in the indicator 15 the rear arm comes into contact with the lower end of the corresponding slot or aperture so that further movement is prevented, and on return movement of the lever the said arm comes into contact with the opposite end of the slot or aperture (as shown) so that the lever comes to rest in the required position.

The type levers 8 are spring controlled, for example by wire, tension or torsion springs suitably associated therewith, so that when any key is released after being struck it is automatically returned to its inoperative position. Conveniently wire springs such as 23 are employed for this purpose, some of these being anchored at one end to a suitable part of the corresponding lever and being arranged to bear at the other end on the underside of the slotted board or plate, grill or grid 22, while other of the said springs are attached at one end to the back member 3 and at the other end are arranged to bear on a part of or on the associated lever. The shift key lever 20 may also be similarly controlled by means of a wire spring such as 24 (see Figure 2). To enable the rear arms 8c of the levers to be inserted into the slots or apertures 22a aforesaid the extremities 8e on which the type characters 13 are provided are, as indicated in Figure 3, made separately and subsequently attached to the levers. For example, each of the said extremities may be detachably connected to its lever as by a tongue and groove, dovetail or like connection.

A sheet 25 of transparent material such as glass or celluloid is preferably provided over the indicator to protect same. This sheet may be and preferably is attached to the indicator so as to be movable therewith.

An imitation space bar 26 is mounted upon compression springs such as 27 centrally in front of the first row of keys 7 so as to be accessible for operation by either of the thumbs. The compression springs are each located between the underside of the space bar and the top of a boss 28 on the front portion, e. g. the cross bar 4, of the frame or casing. Each of the said springs, moreover, is arranged to surround a pin 29 secured at its upper end to the bar 26 and adapted to slide through the corresponding boss.

The frame or casing may be open at the bottom to provide access to the type levers, or may be fitted with a removable bottom to exclude dust.

The device may be made of wood except for the rods or bars 9 on which the type levers 8 are mounted which may be of metal. The indicator card or sheet 15 may, however, be made of cardboard, fibreboard, metal, celluloid, vulcanite or of a casein product or any other suitable sheet material instead of wood. The slotted board, plate, grill or grid 22 may likewise be made of different material. When the type levers are made of wood, wooden keys 7 may be made separately and stuck on. They may be painted or enamelled in the colours required and varnished, or they may have tips or caps of celluloid, vulcanite or a casein product suitably coloured. When made of wood the frame or casing 1 may be painted or stained and varnished or polished.

Alternatively the device may be made mainly of "Bakelite" (registered trade-mark), vulcanite or any other suitable material of similar characteristics, capable of being moulded to required shapes, in which case each type lever and its key may be moulded in one piece. The indicator card or sheet 15 may be made of the same material or of other material as hereinbefore specified.

In the specific example illustrated a dummy shift key lever 30 furnished with a key 30' is provided on the right hand side of the device. The provision of dummy lever 30 and key 30' lends to give the device an appearance of completeness similar to an actual typewriter. This tends to instill in the pupil's mind the fact that there is a shift key at each side of the keyboard in an actual typewriter. While, as shown in the drawings, this dummy lever and key do not effect the operation of any part, they could cause the operation of lever 19 in the same way as does the lever 20.

A mask such as 31 may be provided for covering the indications on the indicator as the pupil or learner gains proficiency. This mask is perforated at 31a to correspond with the apertures or windows 15a in the indicator so that the type characters 13 can still be perceived when the keys 7 are struck. The mask, when provided, may be made of any suitable opaque sheet material, such as cardboard, metal, vulcanite, bakelite, celluloid, fibreboard and the like.

What I claim then is:—

1. A device for teaching and practicing typewriting comprising, in combination, a frame including side members and at least one cross member, the upper edges of said side members being inclined and grooved on the insides adjacent to the inclined edges, a series of type levers pivotally mounted in the frame and each carrying at least two appropriate type characters arranged one above the other, a corresponding series of blank keys associated with the type levers and corresponding in number and arrangement with the conventional keyboard of a typewriter, an indicator in the form of a flat perforated member adapted to slide in the grooves in the side members of the frame, the perforations in the indicator being formed in rows to correspond with the keys and situated above the type characters on the type levers whereby when a lever is operated by striking the appropriate key a type character on said lever can be seen through the corresponding perforation in the indicator, means for locating the said indicator in position at its inner edge, spring means for normally holding the indicator against the locating means, in which position of the indicator the lower series of type characters on the type levers can be seen through the perforations when the keys are struck, and means for moving the indicator rearwards against the spring action so as to enable other characters on the type levers to be seen when the keys are struck.

2. A device for teaching and practicing typewriting comprising, in combination, a frame including side members and at least one cross member, the upper edges of said side members being inclined and grooved on the insides adjacent to the inclined edges, a series of type levers pivotally mounted in the frame and each carrying at least two appropriate type characters arranged one above the other, a corresponding series of blank keys associated with the type levers and corresponding in number and arrangement with the conventional keyboard of a typewriter, an indicator in the form of a flat perforated member having on the underside a depending element and adapted to slide in the grooves in the side members of the frame, the perforations in the indicator being formed in rows to correspond with the keys and situated above the type characters on the type levers whereby when a lever is operated by striking the appropriate key a type character on said lever can be seen through the corresponding perforation in the indicator, means for locating the said indicator in position at its inner edge, spring means for normally holding the indicator against the locating means, in which position of the indicator the lower series of type characters on the type levers can be seen through the perforations when the keys are struck, an operating lever pivoted on an appropriate part of the frame with one end located adjacent to the depending element on the underside of the indicator, and a lever for moving the operating lever to effect a rearward movement of said indicator against the spring action so as to enable other characters on the type levers to be seen when the keys are struck.

3. A device for teaching and practicing typewriting comprising, in combination, a series of blank keys corresponding in number and arrangement with the conventional keyboard of a typewriter, a corresponding series of type levers associated with the said keys and each carrying more than one type character, a movably mounted indicator furnished with apertures arranged to correspond as regards number and position with the number and disposition of the blank keys whereby when a lever is operated by striking the appropriate key a type character on said lever can be seen through the corresponding aperture, means for locating the said indicator in a position in which a type character on each of the type levers can be seen through the corresponding aperture when the appropriate key is struck, and means for moving the indicator so as to enable another character on the said lever to be seen when the same key is struck.

4. A device for teaching and practicing typewriting comprising, in combination, a frame which is grooved on the inside and at each side thereof, a series of movable type levers mounted in the frame and each carrying at least two appropriate type characters arranged adjacent to each other, a corresponding series of blank keys associated with the type levers and corresponding in number and arrangement with the conventional keyboard of a typewriter, an indicator adapted to slide in the grooves in the frame and furnished with apertures disposed in rows to correspond with the keys whereby when a type lever is operated by striking the appropriate key a type character on said lever can be seen through the corresponding aperture, means for locating the said indicator in one position in which position a type character on each of the type levers can be seen through the corresponding aperture when the appropriate key is struck, and means for moving the indicator so as to enable another character on said lever to be seen when the same key is struck.

JOSEPH HENRY BROWNJOHN.